United States Patent [19]

Brusch et al.

[11] Patent Number: 4,843,612
[45] Date of Patent: Jun. 27, 1989

[54] METHOD FOR JAM-RESISTANT COMMUNICATION TRANSMISSION

[75] Inventors: Josef Brusch, Unterhaching; Manfred Hanni, Puchheim; Kurt Hechfellner, Taufkirchen, all of Fed. Rep. of Germany

[73] Assignee: Siemens Aktiengesellschaft, Berlin and Munich, Fed. Rep. of Germany

[21] Appl. No.: 274,142

[22] Filed: Jun. 8, 1981

[30] Foreign Application Priority Data

Jun. 23, 1980 [DE] Fed. Rep. of Germany ....... 3023375

[51] Int. Cl.$^4$ ............................................. H04B 1/10
[52] U.S. Cl. ............................................. 375/1; 380/34
[58] Field of Search ............................ 375/1, 2.1, 2.2; 179/15 A, 15 M, 1.5 R; 455/26-30; 380/34

[56] References Cited

U.S. PATENT DOCUMENTS

| 3,696,306 | 10/1972 | Kline, Jr. | 331/2 |
|---|---|---|---|
| 3,878,525 | 4/1975 | Alpers | 343/14 |
| 3,890,467 | 6/1975 | Sciulli | 179/1 SA |
| 4,004,101 | 1/1977 | Vaillant | 179/1 SA |
| 4,037,159 | 7/1977 | Martin | 325/30 |
| 4,057,690 | 11/1977 | Vagliani et al. | 179/1 SA |
| 4,134,071 | 1/1979 | Ohnsorge | 375/2.2 |
| 4,142,066 | 2/1979 | Ahamed | 179/1 SA |
| 4,185,241 | 1/1980 | Ewanus et al. | 375/2.1 |

FOREIGN PATENT DOCUMENTS 2121117 2/1978 Fed. Rep. of Germany .

OTHER PUBLICATIONS

Flanagan J. L., "Speech Analysis Synthesis and Perception", Springer-Verlag, 2 (1972) pp. 323–329.

Primary Examiner—Salvatore Cangialosi
Attorney, Agent, or Firm—Hill, Van Santen, Steadman & Simpson

[57] ABSTRACT

A method for jam-resistant transmission speech signals by radio which have been processed via vocoders, utilizing spread spectrum multiple access modulation (SSMA) or rapid frequency hopping (FH) provides, with respect to the danger of an inherent jamming brought about when a great number of stations simultaneously use the same frequency band for the same radio channel frequency group, activation and deactivation of the transmitter and receiver at the rate of the internal system frame clock pulse during a frame clock pulse period only when useful information is present. In this manner, in the case of simplexcommunication connections, on the average approximately 40% and, in the case of duplex operation, more than 60%, of the transmitting time can be saved, and hence, the inherent jamming of the system can be reduced in a corresponding fashion.

2 Claims, 2 Drawing Sheets

METHOD FOR JAM-RESISTANT COMMUNICATION TRANSMISSION

BACKGROUND OF THE INVENTION

1. Field of the Invention

The present invention relates to a method for jam-resistant transmission of speech signals, processed via vocoders, by radio, utilizing spread frequency bands (SSMA) or a rapid radio frequency change (frequency hopping FH).

2. Description of the Prior Art

For the use of tactical radio apparatus in the military field, a high-resistance against intentional jamming of all types is of particular significance. To this end, use must be made of transmission methods whose transmission signals cannot be readily impaired by strong jamming. Such a transmission method is, for example, made available for the so-called spread spectrum multiple access (SSMA) modulation technique. An application of this method is disclosed, for example, in the German Letters Pat. No. 2,121,117, fully incorporated herein by this reference. The useful signal to be transmitted is widely spread in its frequency band by an identification modulation, and this spread is canceled (or nullified) again at the receiving side by a correlator. Strong jammers in the form of individual spectral lines are thereby considerably attenuated with respect to the useful signal. An additional method is to make use of a rapid radio frequency change (frequency hopping) during transmission so that a strong jamming transmitter has difficulty adjusting rapidly enough to the radio frequency change just employed. Radio systems making use of a radio frequency hopping procedure are known, for example, from U.S. Pat. No. 4,037,159. The jamming resistance of signals to be transmitted is greater, the smaller the useful (or effective) band width of the signal can be dimensioned in comparison with the transmission band width. For this reason, it is advantageous, in the case of speech transmission, in order to increase the jamming resistance, in addition to the application of the described method, to make use of vocoders. The speech signal is here evaluated (or analyzed) on the transmitting side by a vocoder analyzer with respect to its specific speech parameters, and only the latter are transmitted in coded form towards the receiving side. A the receiving side, in a vocoder synthesizer, the original speech signal is synthesized by means of these parameters in conjunction with a pulse-shaped and a noise-shaped excitation function. In addition to a reduction of the useful band width, the coded form of the signal to be transmitted is simultaneously desirable for an encoding with a high degree of secrecy which, in the case of military applications, in addition to the previously-cited jamming resistance, as a rule is likewise required.

As practice shows, the described methods for jam-resistant communication transmission occasionally gives rise to inherent jammings, In the case of using the SSMA technique, a great number of stations simultaneously use the same frequency band. For a specific receiver, which, with the aid of the correlator allocated thereto, merely receives one signal—determined by the identification modulation—as the useful signal, all simultaneously-transmitted useful signals for the other stations act as spurious (or jamming) signals, or noise signals, respectively, at the receiver input. In other words, relative to the specified frequency band, the number of stations simultaneously in operation must be restricted to such an extent that a receiver can still satisfactorily receive the signal assigned thereto from the noise. The same applies in the case of application of a rapid frequency hopping operation. Here, it is necessary to proceed on the assumption that altogether only a restricted number of radio frequencies on the order of magnitude of approximately 500 are available. Of these 500 radio frequencies, a selection of approximately 120 radio frequency channels can then be made available, for example, to one or more radio circuits. A superior control of several radio circuits in order to realize a synchronous hopping method is virtually not possible for many reasons. For reasons of frequency availability it is likewise impossible to assign to each radio circuit a reserved channel bundle. Since the radio circuits run synchronously neither in the jump phase nor in the jump frequency program, therefore, with calculatable probability, the result must be overlappings of variable width of the information blocks of the same frequency radiated by the various radio apparatus of various radio circuits.

In the case of the mentioned redundancy-decreasing transmission of speech by way of a vocoder, in practice, an acceptable speech quality results if fewer than 2% of all transmission blocks are jammed, in case the block length is sufficiently small and the speech synthesizer is informed of the jamming. In the case of a group of 128 radio hopping frequencies, the jamming quantity would already be exceeded in the case of simultaneous operation of more than three radio circuits within the jamming field intensity range.

SUMMARY OF THE INVENTION

The object of the present invention is to provide an additional solution for a method of the type set forth in the introduction by means of which the inherent jamming is significantly reduced, and thus, in the case of a specified transmission frequency band, or group of radio frequency channels, respectively, when needed, the permissible number of stations simultaneously in operation can be substantially increased.

Beginning with a method for jam-resistant radio transmission of speech signals, processed via vocoders, utilizing spread frequency bands or a rapid frequency hopping operation, the above object is achieved, according to the invention, in that, in the case of processing the speech signal to be transmitted, there is obtained in the transmitting-side vocoder analyzer, a signal criterion relating to the system internal frame clock pulse with the aid of which, in the case of the signal which is present or not present, respectively, in the respective time slot of a frame clock pulse period, the transmitter, or the transmitter end stage, respectively, is switched on or off, respectively. In addition, the signal sections, related to the system internal frame clock pulse, which signal sections are digitized for their transmission to the receiving side, are possibly provided with a data protection information for error recognition At the receiving side, in the case of decoding of the arriving signal sections, the signal criterion is possibly regained from the data protection information, and, relative to the frame clock pulse period, is analyzed in dependence on a present, or non-present, signal for the purpose of switching on or off the receiver output side vocoder synthesizer.

Underlying the present invention is the recognition that, even in the case of simplex communication circuits, on the average, approximately 40% of the transmitting time is unnecessary, even if small portions (from approximately 20 ms in length) are spared. In the case of duplex circuits, under these circumstances, the transmitting time to be spared can amount to even more than 60%. This saving is of full advantage to the inherent jamming (or interference). Therefore, in the case of simplex operation, nearly twice as many stations, in the case of duplex, nearly three times as many stations, can be simultaneously operated in the same radio frequency spectrum if, to this end, the residual error rate, still permitted in the case of known system, is to be observed. In this connection, the fact is also of great advantage that this saving of transmitting time simultaneously has an effect in the form of an increase of the ECM resistance, because here the receivers, of course, are only then switched on when a signal is present in the time intervals specified by the internal frame clock pulse.

In the case of utilization of a rapid radio frequency change, it is necessary, for an optimum exploitation of the reduction of inherent jamming, rendered possible by the solution of the present invention, to make the frequency jumping interval in size to be exactly 1, 2 ... n frame periods of the vocoder and to synchronize the same to the frame clock pulse, or a multiple thereof, respectively In order to prevent the vocoder synthesizer being switched off on the receiving side when the display "no signal" is brought about by a jamming of the reception, it is advantageous to analyze the signal criterion, regained on the receiving side, in a signal analyzer to the second input of which the received signal is supplied. The signal analyzer delivers a control signal for the disconnection of the vocoder synthesizer only when, in the time of a signal criterion "no signal", no signal interruption due to jamming is ascertained.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
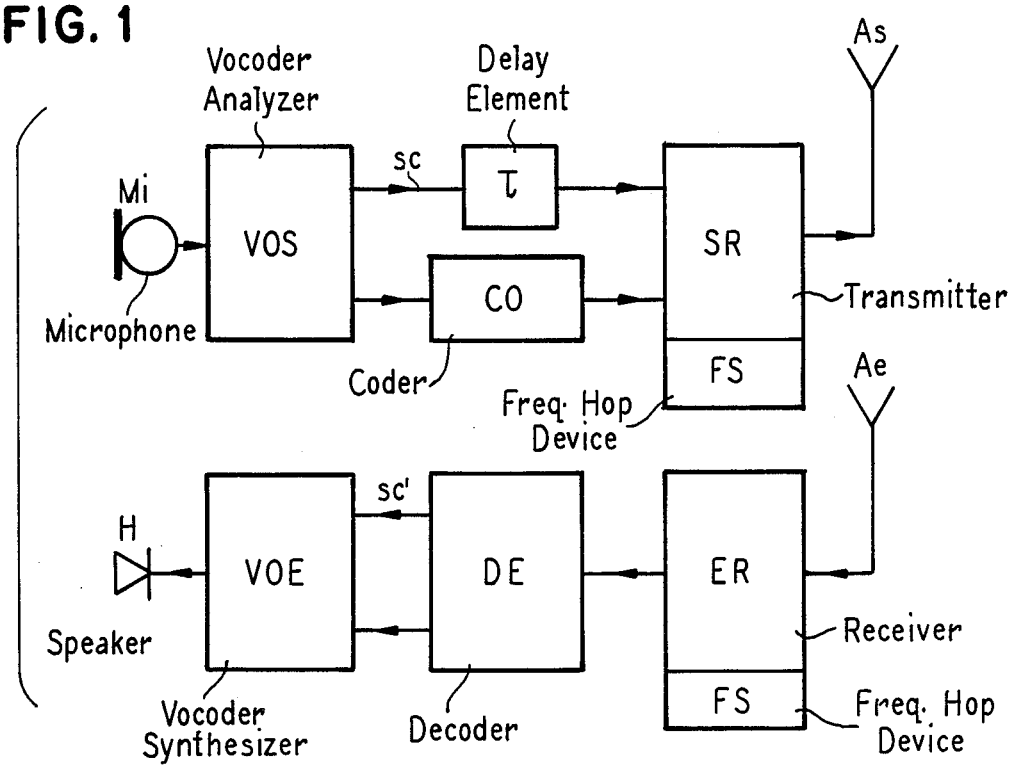
FIG. 1 is a block circuit diagram of the transmitting side and the receiving side of a radio station of a radio system employing a frequency hopping technique, which radio station operates in accordance with the invention in switching on and off of the transmitter or receiver, respectively.

The transmitting side of the block circuit diagram of a radio station illustrated in FIG. 1 includes a vocoder analyzer VOS which is activated by the output signal of a microphone Mi. The vocoder analyzer VOS has two outputs. The one output delivers the parameters representing the speech, which are redundantly coded in a coder CO for the purpose of recognition of transmission errors, and subsequently supplied to a transmitter SR. The transmitter SR, in the exemplary embodiment of FIG. 1, is equipped with a device FS for providing rapid frequency hopping. In the transmitter SR, the coded signals are converted into the radio frequency domain and radiated by way of the antenna As.

The radio frequency signals, received at the receiving side via the antenna Ae, are converted into the base band domain in the receiver ER which is equipped, corresponding to the transmitter SR, with a device FS for synchronous rapid frequency hopping, and subsequently the signals are examined in a decoder DE as to transmission errors. The decoder DE has two outputs which are connected with the two inputs of the receiving side vocoder synthesizer VOE. By way of one input the vocoder synthesizer receives from the decoder DE the specific speech parameters of the speech analyzed at the transmitting side in the vocoder analyzer, with the aid of which, in the synthesizer, the original signal is reconstructed through synthesis and radiated by way of the speaker H.

According to the invention, the transmitting side vocoder analyzer VOS delivers at its second output a signal sc which indicates, respectively, whether, relative to the internal frame clock pulse sequence, a useful signal is present or not during a frame period. The signal sc is obtained in the course of analysis and, by way of a delay element $\tau$, is supplied to a second input of the transmitter SR and there employed for the purpose of switching on and off the transmitter in dependence upon a present, or non-present, signal. In other words, the transmitter SR is always switched off during the operation in the frequency of the internal frame clock pulse of the vocoder analyzer VOS if no signal is present in the time interval of a frame period. The device FS for rapid frequency change is, in this instance, likewise related to the frame clock pulse, namely in such a manner that a radio frequency change is always carried out during the transition from one signal section to another.

In order to be able to switch on and off the receiver on the receiving side in the same manner, depending upon whether a signal is present or not, the receiver or the vocoder synthesizer VOE, must be able to distinguish between signal and noise. In order to guarantee this, the specific speech sampling values at the input of the coder CO, which respectively represent a signal section obtained within a frame period, in the case of a present signal, are provided with a data protection information which, in the decoder DE, permits a recognition or also correction of the transmission errors, and delivers a corresponding signal via its second output, as a signal sc', to the second input of the vocoder synthesizer VOE. In the vocoder synthesizer VOE, the signal sc', obtained in this manner, is analyzed for switching on and off the vocoder synthesizer.

Figure 2:
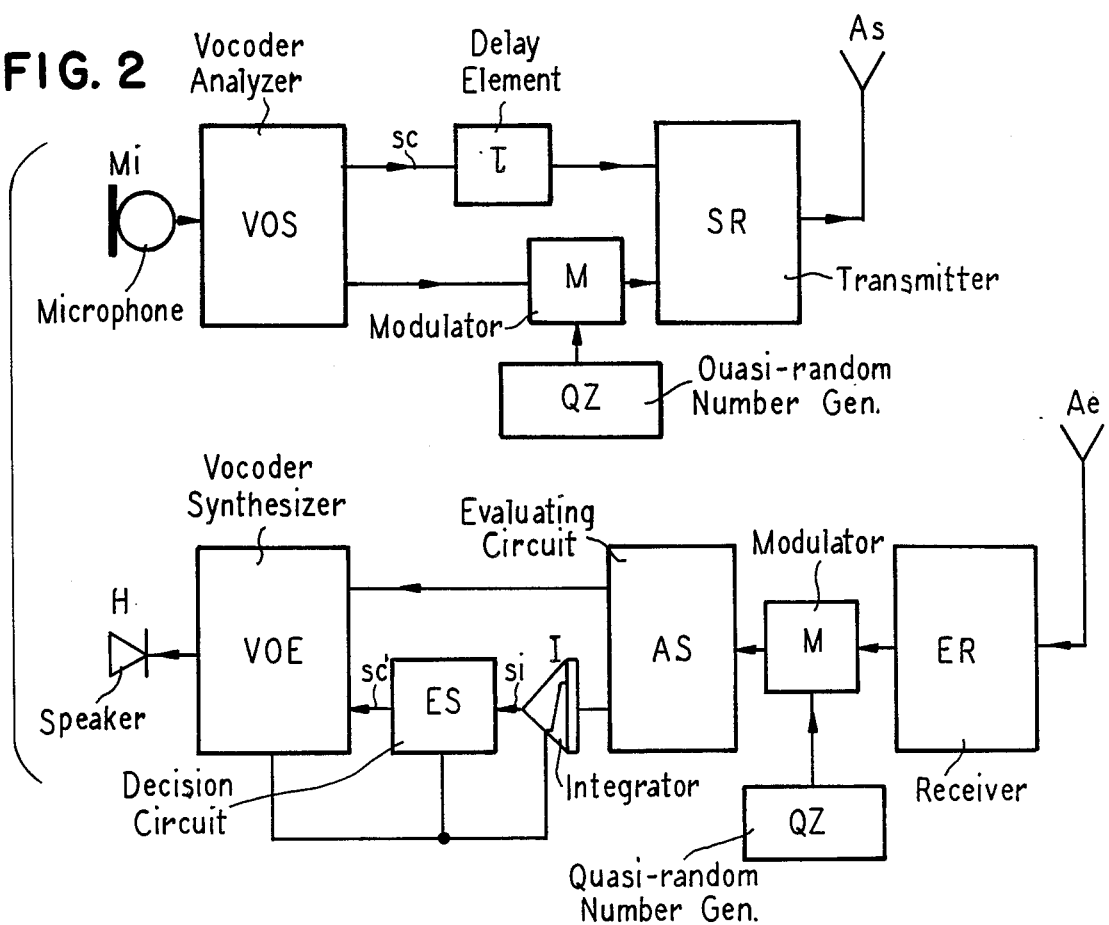
FIG. 2 is a block circuit diagram of a transmitting side and receiving side of a radio station of a radio system employing an SSMA technique, the radio station operating in accordance with the invention in switching on and off the transmitter or the receiver, respectively.

A variation of this technique is illustrated in the exemplary embodiment of FIG. 2 for a radio station in a radio network operating in accordance with the SSMA principle. Here, at the transmission side, the signal sections at the output of the vocoder analyzer VOS are supplied to a modulator M in which an identification modulation, delivered by a quasi-random number generator QZ, is modulated onto each individual bit of the signal sections. The spread in the useful frequency band is canceled at the receiving side, in the same manner, with an identification modulation, generated at the receiving side in an identical quasi-random number generator QZ connected to the modulator M connected to the output of a receiver ER, and the signal obtained in this manner is supplied to an evaluating circuit AS. The evaluating circuit AS delivers, at its first output, the signal bits representing the useful information to the first input of the vocoder synthesizer VOE. A signal then occurs at the second output of the evaluating circuit only when no signal bit, or only noise, respectively, is present. This signal is up-slope integrated in an integrator I for the duration of a signal section. The signal si occurring at the output of the integrator I is supplied to a decision circuit ES which generates the signal sc' at the input of a signal section, and delivers the same to the second input of the vocoder synthesize. VOE for the purpose of switching on and off the same in dependence upon a present or non-present signal section.

Figure 3:
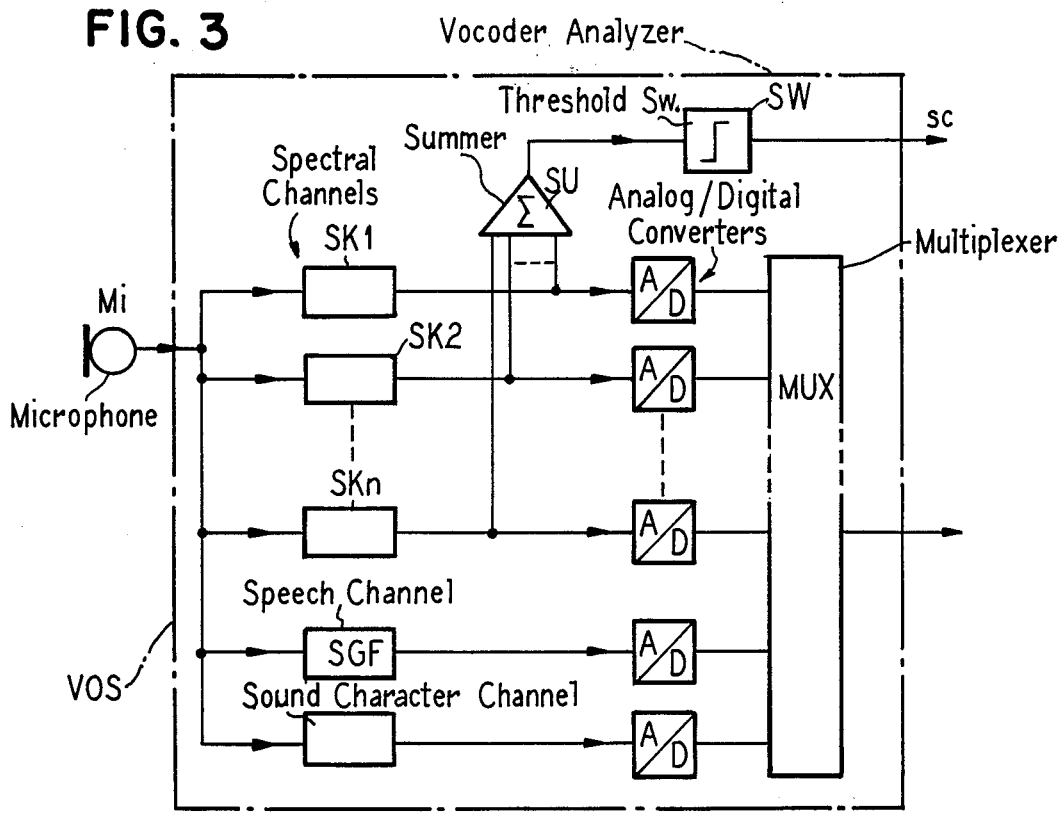
FIG. 3 is a block circuit diagram, exhibiting further details, of a transmitting side vocoder analyzer according to FIGS. 1 and 2.
Figure 4:
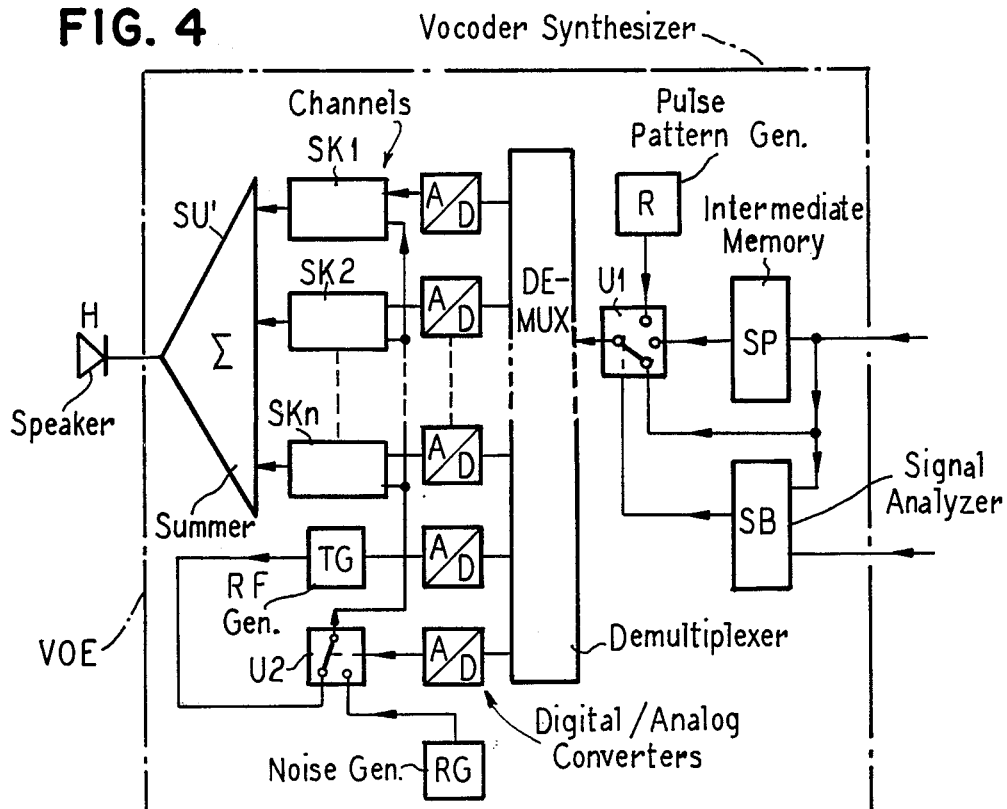
FIG. 4 is a block circuit diagram exhibiting further details of the receiving side vocoder synthesizer according to FIGS. 1 and 2.

For a better understanding of the method of operation of the switching on and off of the transmitter or receiver, respectively, according to the present invention, in the case of the radio stations illustrated in FIGS. 1 and 2, in FIGS. 3 and 4 block diagrams exhibit greater details of the transmitting side vocoder analyzer VOS and the receiving side vocoder synthesizer VOE. The transmitting side analysis portion of the vocoder according to FIG. 3 comprises, at the output of the microphone Mi, parallel-connected spectral channels SK1–SKn. These spectral channels separate the speech band, by means of band pass filters, into various sub-bands, which are rectified at the output side and, via a low pass filter, are freed of undesired higher frequency components. Subsequently, these output signals of the spectral channels, also designated at envelope partial curve signals, are sampled and converted into coded signals in an analog/digital converter A/D.

For the receiving side synthesis of the speech present at the microphone output, a signal characterizing the speech fundamental frequency, a so-called pitch signal, and a signal indicating the voiced/invoiced condition must yet be additionally attained. In the analysis portion of the vocoder according to FIG. 3, to this end, two channels are additionally provided, namely a channel SGF having a speech fundamental frequency filter and a channel LB having a circuit for determining the sound character. The output side signals of the channels SGF and LB are likewise coded via respective analog/digital converters A/D and, together with the digital outputs of the spectral channels SK1–SKn, are combined in a mutiplexer MUX into a pulse frame having a frame period of approximately 20 ms. The signal sc, necessary for the switching on and off of the transmitter SR is obtained, with the aid of a summing amplifier SU and a threshold value circuit SW connected to the output of the summing amplifier SU. The summing amplifier SU sums up the signals present at the inputs of the analog/digital converters A/D of the spectral channels. Depending upon whether the sum value exceeds the threshold of the threshold value circuit SW or not, the output signal of the threshold value circuit indicates the criteria "signal present" or "signal not present".

The receiving side synthesis portion of the vocoder comprises, at its input side, an intermediate memory SP to which a selection switch U1 is connected. The selection switch U1 has three switching positions from which, in the illustrated switching position, it forwards the input signal directly to a demultiplexer DE-MUX while bypassing the intermediate memory SP. In the center switching position, the input of the demultiplexer DE-MUX is connected with the output of the intermediate memory SP, and, in the upper switching position, it is connected with the output of a device R which, in the most general instance, delivers a pulse pattern characterizing the quiescent state.

A digital/analog converter D/A is connected to each of the outputs of the demultiplexer. The converters are followed by the spectral channels SK1–SKn. The signal containing the speech fundamental frequency is supplied, at the output of the respective digital/analog converter D/A, to the control input for the tone pitch of a tone generator TG. The signal indicating the sound character, in turn, controls the operation of a switch U2 which, depending upon whether the speech signal is voiced or voiceless, supplies to all second inputs of the spectral channels, either the output signal of the tone generator TG or the output signal of a noise generator RG. The synthesized sub-band channels of the original speech channel, present at the output of the spectral channels SK1–SKn are summed up in a summing amplifier SU' and supplied to a speaker connected to its output.

As illustrated in FIG. 4, the vocoder synthesizer VOE comprises at its input side a signal analyzer SB, having a first input for receiving the incoming signal and a second input for receiving the signal sc', obtained in the decoder DE according to FIG. 1 or in the integrator I according to FIG. 2. The signal analyzer SB comprises a computer which examines the signal supplied thereto at the first input as to whether an occurring signal pause is inherent in speech, or, however, whether it was caused by jamming of the signal on the transmission link. Only if, in the time of the occurrence of the signal criterion "signal not present", the signal analyzer ascertains no signal jamming, is the switch U1 operated by the signal analyzer into the upper position connected with the device R for receiving the predetermined pulse pattern characterizing the quiescent state. Otherwise, the signal analyzer SB controls the switch U1 into the center switching position in which there is supplied to the demultiplexer DE-MUX, instead of a jammed signal section, a preceding signal section is intermediately stored in the intermediate memory SP.

Although we have described our invention by reference to particular illustrative embodiments, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method for jam-resistant communication of useful signals between transmitting means of a transmitting station and receiving means of a receiving station in which a speech signal to be transmitted is fed to the transmitting means via a vocoder analyzer and in which the received signal is fed from the receiving means via a vocoder synthesizer to a receiver output, and in which the system operates with frame clock pulses, the improvement therein comprising the steps of:

generating a first information signal in the vocoder analyzer indicating whether a speech signal is present or absent within a frame period;

applying the first information signal to the transmitting means to switch the same on during the presence of a useful signal to transmit the coded useful signal to the receiving means and off during the time that a useful signal is not present during a respective time element of a frame period;

receiving the transmitted signal;

deriving from the signals received a second information signal indicating the presence or absence of a useful signal at the transmitting station; and applying the second information signal to the vocoder analyzer to switch the same on or off, respectively, when a useful signal is present or not present.

2. The improved method of claim 1, comprising the step of:

transmitting the vocoder synthesizer signal in accordance with spread spectrum multiple access modulation.

* * * * *

UNITED STATES PATENT AND TRADEMARK OFFICE
CERTIFICATE OF CORRECTION

PATENT NO. : 4,843,612
DATED : June 27, 1989
INVENTOR(S) : Josef Brusch, Manfred Hanni & Kurt Hechfellner It is certified that error appears in the above-indentified patent and that said Letters Patent is hereby corrected as shown below:

Claim 1, Column 7, line 8, delete "analyzer" and insert --synthesizer-- therefor.

Signed and Sealed this

Sixteenth Day of July, 1996

Attest:

BRUCE LEHMAN

Attesting Officer

Commissioner of Patents and Trademarks